(12) United States Patent
Gallagher

(10) Patent No.: US 7,536,675 B2
(45) Date of Patent: *May 19, 2009

(54) DYNAMIC CODE GENERATION SYSTEM

(75) Inventor: William John Gallagher, Easton, PA (US)

(73) Assignee: BEA Systems, Inc., Redwood Shores, CA (US)

( * ) Notice: Subject to any disclaimer, the term of this patent is extended or adjusted under 35 U.S.C. 154(b) by 446 days.

This patent is subject to a terminal disclaimer.

(21) Appl. No.: 10/706,516

(22) Filed: Nov. 12, 2003

(65) Prior Publication Data

US 2004/0172613 A1 Sep. 2, 2004

Related U.S. Application Data

(60) Provisional application No. 60/450,720, filed on Feb. 28, 2003.

(51) Int. Cl.
*G06F 9/44* (2006.01)

(52) U.S. Cl. .................. 717/106; 717/107; 717/108; 717/109; 717/110; 717/111; 717/112; 717/136; 717/153; 707/103 R; 703/4; 719/316

(58) Field of Classification Search .......... 717/106–112
See application file for complete search history.

(56) References Cited

U.S. PATENT DOCUMENTS

| | | | | |
|---|---|---|---|---|
| 4,989,132 | A * | 1/1991 | Mellender et al. ........... 717/139 |
| 5,815,415 | A * | 9/1998 | Bentley et al. ................ 703/4 |
| 5,999,988 | A | 12/1999 | Pelegri-Llopart et al. |
| 6,011,917 | A * | 1/2000 | Leymann et al. ........... 717/104 |
| 6,011,918 | A * | 1/2000 | Cohen et al. ............... 717/106 |
| 6,085,030 | A * | 7/2000 | Whitehead et al. .......... 709/203 |
| 6,085,198 | A * | 7/2000 | Skinner et al. ......... 707/103 R |
| 6,125,383 | A * | 9/2000 | Glynias et al. ............. 709/202 |
| 6,157,960 | A | 12/2000 | Kaminsky ................... 709/303 |
| 6,199,195 | B1 * | 3/2001 | Goodwin et al. ............ 717/104 |
| 6,381,737 | B1 * | 4/2002 | Click et al. ................. 717/136 |
| 6,385,661 | B1 | 5/2002 | Guthrie ...................... 709/316 |
| 6,510,550 | B1 | 1/2003 | Hightower .................. 717/108 |
| 6,523,171 | B1 | 2/2003 | Dupuy et al. |
| 6,549,955 | B2 * | 4/2003 | Guthrie et al. ............. 719/315 |
| 6,578,191 | B1 * | 6/2003 | Boehme et al. ............ 717/107 |
| 6,629,128 | B1 | 9/2003 | Glass ........................ 709/203 |
| 6,877,163 | B1 * | 4/2005 | Jones et al. ................. 719/332 |

(Continued)

OTHER PUBLICATIONS

Ian Welch and robert Stroud, "From Dalang to Kava- the Evolution of a Reflective Java Extension" Sep. 1999, reflection 99, LNCS 116, pp. 2-21.

(Continued)

*Primary Examiner*—Wei Y Zhen
*Assistant Examiner*—Phillip H Nguyen
(74) *Attorney, Agent, or Firm*—Fliesler Meyer LLP

(57) ABSTRACT

A system for high level dynamic hot code generation. A class file container object is first created. Methods and code are then added to the class file container object. Byte code is then generated from the populated class file container object. From the byte code, instances of the new class object can by generated. The program code generator is configured to generate code at a programming language construct level, thereby working at a level of program language statements, expressions, variables, and other constructs.

17 Claims, 1 Drawing Sheet

U.S. PATENT DOCUMENTS

| | | | |
|---|---|---|---|
| 6,951,021 B1 * | 9/2005 | Bodwell et al. | 719/316 |
| 6,993,774 B1 * | 1/2006 | Glass | 719/330 |
| 7,051,324 B2 | 5/2006 | Gissel | 717/166 |
| 7,146,399 B2 | 12/2006 | Fox | |
| 7,181,745 B1 * | 2/2007 | Foti | 719/310 |
| 2004/0015832 A1 * | 1/2004 | Stapp et al. | 717/106 |
| 2004/0019596 A1 * | 1/2004 | Taylor et al. | 707/100 |
| 2004/0028031 A1 | 2/2004 | Valin | |
| 2004/0143835 A1 | 7/2004 | Dattke et al. | |

OTHER PUBLICATIONS

Ian Welch and Robert Stroud, "Using MetaObject Protocols to Adapt Third-Party components" Mar. 1998, 1-22.

Ian Welch and Robert Stroud, A reflective Java Class Loader ECOOP'98 Workshop reader, LNCS, pp. 374-375. 1998.

* cited by examiner

DYNAMIC CODE GENERATION SYSTEM

CLAIM TO PRIORITY

The present application claims the benefit of priority under 35 U.S.C. §119(e) to U.S. Provisional Patent Application entitled "A SYSTEM FOR GENERATING HOT CODE", Application No. 60/450,720, filed on Feb. 28, 2003, which application is incorporated herein by reference

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The present application is related to the following United States Patents and Patent Applications, which patents/applications are assigned to the owner of the present invention, and which patents/applications are incorporated by reference herein in their entirety:

U.S. patent application Ser. No. 10/706,515 by Fei Luo, et al., entitled "Dynamically Generated Wrapper", filed on Nov. 12, 2003 currently pending; and U.S. patent application Ser. No. 10/712,384, by William John Gallagher, entitled "Dynamic Code Generation Method", filed on Nov. 12, 2003, currently pending.

FIELD OF THE INVENTION

The current invention relates generally to automatically generating program code, and more particularly to high level hot code generation in an object based programming language.

BACKGROUND OF THE INVENTION

Application server systems provide an environment that allows client applications to implement services over a server network. The application server network may include vendor resources for providing services to the client applications. One such application server system is Web Logic Server, provided by BEA Systems of San Jose, Calif.

As vendor resources and application server utilities are used by client applications, it is often necessary to introduce adapters or proxies to mediate requests between clients and application server resources. A proxy is a class that has the same interface as some other class that it is taking the place of. An adapter takes the place of some class and exposes it through a different interface. A typical application server system implements a large number of proxies as resources are invoked and other services are performed. Many of these proxies require substantial amounts of code while often utilized for limited periods of time. Thus, it is not desirable to implement the interfaces for the lifetime of the application server system.

One approach is to have a user initiate code generation for the interfaces only when the interface is actually needed. In this case, a client application may run a code generation tool to statically generate a JAVA™ file and compile the JAVA™ file into a class file. The user then makes the class available to the JAVA™ virtual machine. This approach is undesirable because it requires a user to manually perform many steps to generate the code.

Another method for generating interfaces involves JAVA™ dynamic proxies. JAVA™ dynamic proxies require that an interface and an invocation handler be provided by a user. In return, the JAVA™ dynamic proxy generation system provides a class that will forward invocations to the invocation handler. JAVA™ dynamic proxies are limited in the types of classes that they generate. It is not possible, for example, to generate a class that is a subclass of a user defined class. Another problem with dynamic proxies is that they are not as efficient as dynamic code generation. To implement many types of proxies, it is often necessary to use reflection within the invocation handler. Reflection is not as efficient as early bound invocation. There is also a cost associated with the way that dynamic proxies marshal the arguments for an invocation into an object array.

What is needed is an improved system and method for generating program code at runtime for any type of class.

SUMMARY OF THE INVENTION

The present invention includes a system for high level dynamic hot code generation. A class file container object is first created. Methods and code are then added to the class file container object. Byte code is then generated from the populated class file container object. From the byte code, instances of the new class object can by generated. The program code generator is configured to generate code at a programming language construct level, thereby working at a level of program language statements, expressions, variables, and other constructs.

DETAILED DESCRIPTION

Figure 1:
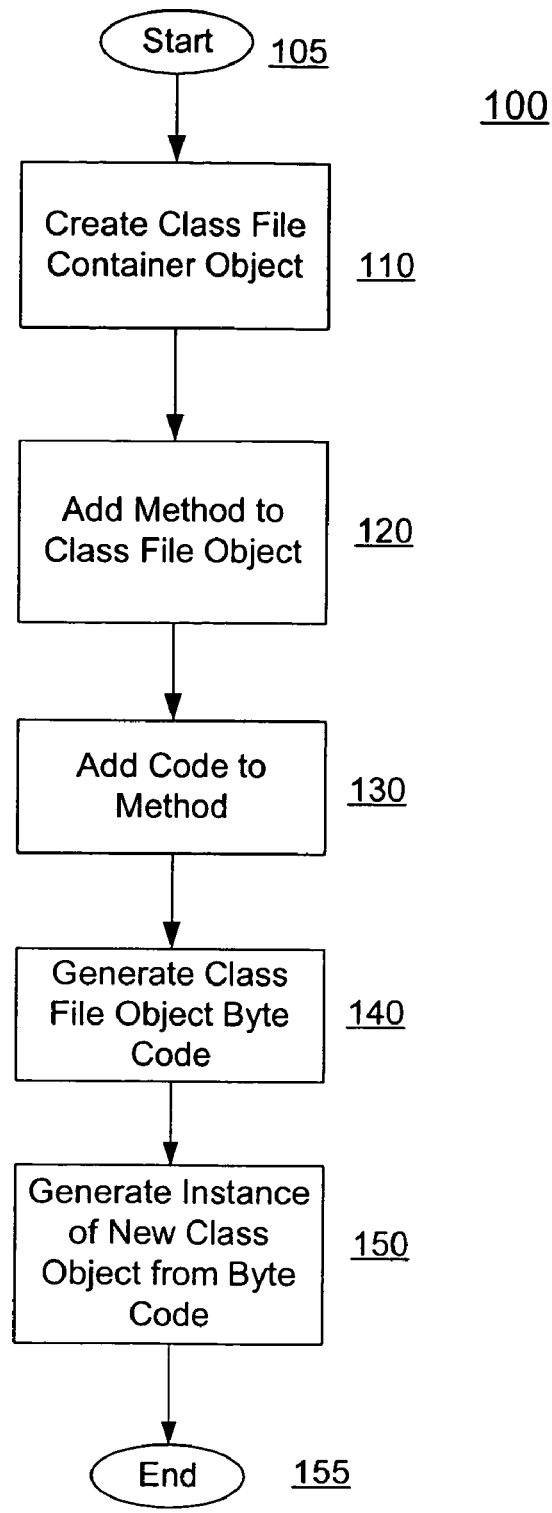
FIG. 1 is an illustration of a method for automatically generating program code in accordance with one embodiment of the present invention.

The automatic program code generator of the present invention provides a high level means to dynamically generate code. The program code generator is configured to generate code at a programming language construct level, thereby working at a level of program language statements, expressions, variables, and other constructs. The code generation can occur as part of a stand-alone application or within the application server process. Typically, the code generated would be configured to exist for the life of the server. In one embodiment, the code generated could be configured to last for some time shorter or longer than the server it resides on, depending on the application and scope of the code generated.

In one embodiment, the JAVA™ based automatic program code generator may be used to generate code for any type of JAVA™ program. The invention is especially useful when used to build efficient adapters and proxies. Applications of the JAVA™ automatic code generator include but are not limited to remote method invocation (RMI) skeletons, RMI stubs, wrappers for JDBC connections, and proxies used to enforce call-by-value semantics between EJBs, the latter of which are applied to copying parameters. Typically, the code implementing a proxy or adaptor is dynamically generated when the code is needed, such as when a remote method is invoked on a resource. However, the dynamic code generation of the present invention may occur at any time depending on the particular application and resource available.

An Application Programming Interface (API) may be used to define a method or code in the method that will comprise the class file container object. FIG. 1 illustrates a method 100 for automatically generating program code in accordance with one embodiment of the present invention. Method 100 begins with start step 105. Next, a class file container object is created in step 110. The class file container object is a representation of a class file. In one embodiment, creating a class file container object includes setting attributes for the class file. The attributes may include the class file name, parent super class, and other attributes.

A method is then added to the class file object at step 120. At generation, the method is empty and contains no code. Step 120 may be repeated several times depending on the number of methods that will be contained within the class file. For example, for a stub generated for a remote object, the stub may include several methods. In this case, for each method in the remote interface, a method would be added to the new class file container object. Code may then be added to the method at step 130. In one embodiment, code is added to a method using constructs that correspond to JAVA™ language statements, expressions, variables, or any other programming elements. Each of these constructs may include parameters as necessary.

Steps 120-130 generate a tree of statements and expressions. The tree represents at least one method containing at least one code statement, expression, variable, or other programming construct.

When the class file container is to be a known type, such as a proxy or adapter, the tree may form a known structure or interface. The organization of the objects in a particular structure or interface avoids the need for a compiler. In one embodiment of the present invention, each statement or expression type is represented as an object. The assembling of received objects into new class objects may be modified to fulfill specific program code implementations and applications.

After the class file container object methods and code have been added, JAVA™ bytecode may be generated at step 140. In operation, each statement maintains the state of the program being generated. The maintained state includes, among other things, the contents of the stack and the contents of the local variables that are in use at each point of the program flow. The statement uses this state to generate an intermediate representation of the program flow that consists of JAVA™ objects that represent individual bytecode instructions. A bytecode assembler converts the intermediate representation into bytecode that can be interpreted by a JAVA™ virtual machine.

After generating the byte code for the class file container object, an instance of the new class file object may be generated at step 150. Operation of method 100 then terminates at step 155. A class loader can be used to generate executable code from the generated byte code.

A pseudo code example of the API used to generate code as discussed above is shown below. Line numbers 201-206 are illustrated for reference purposes only.

```
import java.io.*;                                              201
import java.lang.reflect.*;
import weblogic.utils.classfile.*;
import weblogic.utils.classfile.expr.*;
public class gen {
```

-continued

```
public static void main(String[ ] args) throws Exception
{                                                              210
    FileOutputStream fos = new FileOutputStream("MyClass.class");
    ClassFile classFile = new ClassFile( );                    213
    classFile.setClassName("MyClass");
    classFile.setSuperClassName("java.lang.Object");
    //   adds the method:
    //       public static void main(String[ ] s) { ... }
    MethodInfo methodHandle =
       219
       classFile.addMethod("main", "([Ljava/lang/String;)V",   220
                Modifier.PUBLIC | Modifier.STATIC);
    Field f = System.class.getField("out");
    Method m =
       PrintStream.class.getMethod("println", new Class[ ] {
String.class}
);
    Expression[ ] arguments = new Expression[] { Const.get("Hello
World!") };                                                    230
    CompoundStatement code = new CompoundStatement( );
    //   add the code:
    //       System.out.println("Hello World!");
    code.add(new InvokeExpression(f, m, arguments));           236
    //   add the code:
    //       return;
    code.add(new ReturnStatement( ));                          240
    methodHandle.setCode(code);
       242
    classFile.write(fos);                                      244
}
}
```

In the pseudo code above, the class file container object is generated using the ClassFile statement at line 213. A method is added using the addMethod(NAME, DESCRIPTOR, MODIFIERS) method, wherein the NAME is the name associated with the method. At line 220, the NAME is "main". Information regarding the method "main" is provided at line 220 in the parameters DESCRIPTOR and MODIFIERS. The "addMethod" method returns a handle to the method called "methodHandle". Code is then compiled into a list of statements using the statements at lines 236 and 240. The code is associated with a particular method using a methodHandle.add( ) statement, wherein methodHandle refers to the method added at line 219. Code is added to a method using a methodHandle.setCode (XXX) format, wherein "methodHandle" is a handle to the method to populate with code and XXX identifies the code. In the pseudo code above, the statement method.setCode (code) adds two lines of code tagged with "code" to the method "method". The class file is then written using a classFile.write (YYY) format, wherein the YYY represents the file output stream.

The pseudo code above generates the following class.

```
import java.io.PrintStream;
public final class MyClass
{
    public static void main(String args[ ])
    {
        System.out.println("Hello World!");
    }
}
```

The class above is a simplified example that is configured to generate text that reads, "Hello World!". The pseudo code above illustrates code for generating two types of expressions, an invoke expression and a return statement. This illustration is for illustrative purposes only. Other expressions, statements, variables, and other programming constructs are within the scope of the present invention. These programming constructs may include, but are not limited to, switch statements, array expressions (such as an expression allowing one to index into an array), cast expressions (allowing a cast from one object type to another), compound statements (a list of statements), conditional expressions (including Boolean expressions), constant expressions (for all primitive programming types), invoke expressions (for invoking methods on different types of objects), expressions that represent local variables of a method, and expressions for creating new objects and arrays. In one embodiment, the code generation tool of the present invention may be configured to include an expression that represents each JAVA™ programming expression and a statement that represents each JAVA™ programming statement.

Dynamic code generation can be used to implement an adaptor class in a similar manner to that discussed above. In this embodiment of the present invention, the generated adapter class that may look like the code shown below.

```
interface Foo
{
    public void bar( );
}
FooProxy implements Foo
{
    FooImpl delegate;
    public void bar( ) {
        //    perform some pre-processing
        //    invoke
        delegate.bar( );
        //    perform some post-processing
    }
}
```

As will be understood by those in the field of programming, this is much more efficient than using an invocation handler with Dynamic Proxies.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, assembling class file objects, generating a parse tree, instantiating class file objects, and generating byte code.

The invention claimed is:

1. A computer program product including a storage medium with instructions thereon for execution by a computer for high level dynamic code generation, the instructions comprising:
   a) computer code for dynamically generating at run-time a class file container object that stores source code describing a class file, wherein generating the class container object includes selecting a class name and a super class for the class, wherein dynamically generated code exists for the life of a server it resides upon;
   b) computer code for adding a first source code defining a method to the class stored in the class file container object, wherein an application programming interface is used to define the method;
   c) computer code for repeating step b for each method of the class;
   d) computer code for adding a second source code into the method in the class stored in the class file container object, wherein an application programming interface is used to define code added into the method;
   e) computer code for repeating step d to populate each method of the class stored in the class file container object;
   f) computer code for generating a tree of statements and expressions based on the class stored in tile class file container object, wherein each statement and expression is represented as an object, wherein each statement maintains state of the program being generated, wherein the tree of statements and expressions forms a known structure when the class is at least one of an adapter and a proxy type, wherein organization of objects in a particular structure or interface avoids a need for a compiler;
   g) computer code for using the tree of statements and expressions to generate byte code for the class; and
   h) computer code for instantiating an instance of a new class file object from the byte code.

2. The computer program product of claim 1, wherein the computer code implements an adapter class.

3. The computer program product of claim 1, wherein the computer code implements a proxy class.

4. The computer program product of claim 1, further comprising computer code for:
repeatedly adding a method to the class stored in the class tile container object for each method associated with a stub generated for a remote object.

5. The computer program product of claim 4, wherein the computer code for repeatedly adding a method to the class stored in the class file container object for each associated with a stub generated for a remote object includes program code for:
determining a number of methods associated with the stub in a remote interface.

6. The computer program product of claim 1, wherein the tree of statements and expressions represents at least one method, the at least one method comprising at least one of a code statement, an expression, a variable and a programming construct.

7. The computer program product of claim 1, wherein the tree of statements and expressions forms a known structure or interface when the class is a known type.

8. The computer program product of claim 1, wherein the dynamically generated code is used for remote method invocation skeletons, remote method invocation stubs, wrappers for database connections, and proxies used to enforce call-by-value semantics.

9. The computer program product of claim 1, further comprising computer code for generating executable code from the byte code by using a class loader.

10. The computer program product of claim 1, wherein a statement uses the maintained state to generate an intermediate representation of Java objects that represent individual bytecode instructions.

11. The computer program product of claim 1, wherein a bytecode assembler converts an intermediate representation into bytecode that can be interpreted by a Java virtual machine.

12. The computer program product of claim 1, wherein code is added to a method using constructs that correspond to Java language statements, expressions, and variables.

13. The computer program product of claim 1, wherein after the method is defined in step b, the method is initially empty and contains no code until code is added into the method in step d.

14. The computer program product of claim 1, wherein an application programming interface is used to define a method or code in the method that is added to the class file container object.

15. The computer program product of claim 1, wherein dynamic code generation occurs as part of an application server process.

16. The computer program product of claim 1, wherein the maintained state includes contents of a stack and contents of local variables that are in use at each point of program flow.

17. A system, comprising:
one or more processors; and
an application server including a dynamic code generation module with instructions for execution by the one or more processors, the instructions comprising:
a) computer code for dynamically generating at run-time a class file container object that stores source code describing a class, wherein generating the class file container object includes selecting a class name and a super class for the class;
b) computer code for adding a first source code defining a method to the class stored in the class file container object, wherein an application programming interface is used to define the method;
c) computer code for repeating step b for each method of the class;
d) computer code for adding a second source code into the method in the class stored in the class file container object, wherein an application programming interface is used to define code added into the method;
e) computer code for repeating step d to populate each method of the class stored in the class file container object;
f) computer code for generating a tree of statements and expressions based on the class stored in the class file container object, wherein each statement and expression is represented as an object, wherein each statement maintains state of the program being generated, wherein the tree of statements and expressions forms a known structure when the class is at least one of an adapter and a proxy type, wherein organization of objects in a particular structure or interface avoids a need for a compiler;
g) computer code for using the tree of statements and expressions to generate byte code for the class and
h) computer code for instantiating an instance of a new class file object from the byte code.

* * * * *

UNITED STATES PATENT AND TRADEMARK OFFICE
CERTIFICATE OF CORRECTION

PATENT NO. : 7,536,675 B2
APPLICATION NO. : 10/706516
DATED : May 19, 2009
INVENTOR(S) : Gallagher It is certified that error appears in the above-identified patent and that said Letters Patent is hereby corrected as shown below:

Title page, Item (57), "Abstract", delete "by" and insert -- be --, therefor.

In column 1, line 9, after "reference" insert -- . --.

In column 2, line 30, delete "by" and insert -- be --, therefor.

In column 2, line 61, delete "remote method invocation" and insert -- Remote Method Invocation --, therefor.

In column 2, line 62, delete "JDBC" and insert -- Java Database Connectivity (JDBC) --, therefor.

In column 2, line 63, delete "EJBs," and insert -- Enterprise Java Beans (EJBs), --, therefor.

In column 6, line 55, in claim 1, delete "tile" and insert -- the --, therefor.

In column 7, line 8, in claim 4, delete "tile" and insert -- file --, therefor.

In column 7, line 12, in claim 5, after "each" insert -- method --.

In column 7, line 20, in claim 6, delete "of" and insert -- of: --, therefor.

In column 7, line 33, in claim 9, delete "byte code" and insert -- bytecode --, therefor.

In column 8, line 45, in claim 17, after "class" insert -- ; --.

Signed and Sealed this

First Day of June, 2010

David J. Kappos
*Director of the United States Patent and Trademark Office*